United States Patent
Mosko et al.

(10) Patent No.: US 10,187,801 B2
(45) Date of Patent: Jan. 22, 2019

(54) MOBILE APPLICATION SPECIFIC NETWORKS

(71) Applicant: CISCO TECHNOLOGY, INC., San Jose, CA (US)

(72) Inventors: Marc E. Mosko, Santa Cruz, CA (US); Jose J. Garcia-Luna-Aceves, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 14/505,407

(22) Filed: Oct. 2, 2014

(65) Prior Publication Data
US 2016/0100316 A1    Apr. 7, 2016

(51) Int. Cl.
| | |
|---|---|
| H04W 16/04 | (2009.01) |
| H04W 84/20 | (2009.01) |
| H04W 40/12 | (2009.01) |
| H04L 12/24 | (2006.01) |
| H04L 12/725 | (2013.01) |

(52) U.S. Cl.
CPC ......... *H04W 16/04* (2013.01); *H04L 41/12* (2013.01); *H04W 40/125* (2013.01); *H04W 84/20* (2013.01); *H04L 45/306* (2013.01)

(58) Field of Classification Search
None
See application file for complete search history.

(56) References Cited

U.S. PATENT DOCUMENTS

| | | | | |
|---|---|---|---|---|
| 2006/0080417 A1* | 4/2006 | Boutboul | ............... | H04L 41/12 709/220 |
| 2007/0053309 A1* | 3/2007 | Poojary | ................... | H04L 45/22 370/256 |
| 2007/0091838 A1* | 4/2007 | Kobayashi | ............. | H04L 45/42 370/328 |

(Continued)

FOREIGN PATENT DOCUMENTS

| | | |
|---|---|---|
| WO | 2014/147197 A1 | 9/2014 |
| WO | 2014/153421 A2 | 9/2014 |

OTHER PUBLICATIONS

Bhargava et al., "Integrating Heterogeneous Wireless Technologies: A Cellular Aided Mobile Ad Hoc Network (CAMA)", 2004, [retrieved on Feb. 20, 2018], [retreived from the internet URL<https://link.springer.com/content/pdf/10.1023%2FB%3AMONE.0000031606.04846.fa.pdf>].*

(Continued)

*Primary Examiner* — Ayaz R Sheikh
*Assistant Examiner* — Mariela Vidal Carpio (57) ABSTRACT

One embodiment provides a system that facilitates a large-scale mobile ad hoc network to adapt to specific needs of wireless nodes in a mobile wireless network. During operation, a controller node collects state information associated with one or more wireless nodes. The controller node allocates one or more network elements based on the collected state information and a predetermined utility-based technique. Responsive to the allocation of the one or more network elements, the controller node reconfigures a logical topology of the mobile wireless network by using software-defined mobile ad hoc network nodes, thereby facilitating a large-scale mobile ad hoc network to adapt to specific application needs of wireless nodes.

21 Claims, 7 Drawing Sheets

(56) References Cited

U.S. PATENT DOCUMENTS

2008/0002574 A1\* 1/2008 Mosko .................... H04L 43/08
370/229
2013/0103817 A1 4/2013 Koponen et al.
2014/0098673 A1 4/2014 Lee et al.
2015/0195162 A1\* 7/2015 Gandham ............... H04L 41/04
709/206

OTHER PUBLICATIONS

Examination Report in corresponding European Application No. 15185761.2, dated Aug. 11, 2017, 5 pages.
Extended European Search Report in corresponding European Application No. 15185761.2, dated Feb. 23, 2016, 9 pages.

\* cited by examiner

MOBILE APPLICATION SPECIFIC NETWORKS

RELATED APPLICATION

The subject matter of this application is related to the subject matter in the following applications:
U.S. patent application Ser. No. 14/161,410, entitled "GATEWAYS AND ROUTING IN SOFTWARE-DEFINED MANETS," by inventors Marc E. Mosko and Jose J. Garcia-Luna-Aceves, filed 22 Jan. 2014 (hereinafter "U.S. patent application Ser. No. 14/161,410");
U.S. patent application Ser. No. 14/161,406, entitled "SERVICE-ORIENTED ROUTING IN SOFTWARE-DEFINED MANETS," by inventors Marc E. Mosko and Jose J. Garcia-Luna-Aceves, filed 22 Jan. 2014 (hereinafter "U.S. patent application Ser. No. 14/161,406"); and
U.S. patent application Ser. No. 13/898,339, entitled "METHOD AND SYSTEM FOR NAME RESOLUTION ACROSS HETEROGENEOUS ARCHITECTURES," by inventors Spencer Sevilla, Priya Mahadevan, and Jose J. Garcia-Luna-Aceves, filed 20 May 2013 (hereinafter "U.S. patent application Ser. No. 13/898,339");
the disclosures of which are herein incorporated by reference in their entirety.

BACKGROUND

Field

This disclosure is generally related to mobile ad hoc networks (MANETs). More specifically, this disclosure is related to a mobile application specific network (MASNET) based on an intelligent backbone infrastructure to facilitate large-scale MANETs that adapt to application needs.

Related Art

Typical ad hoc communication systems oftentimes require independent mobile users that can communicate in a non-centralized and self-organized fashion. For example, mobile ad hoc networks (MANETs) employ peer-to-peer a communication protocol to determine a path between two wireless nodes. Some key characteristics of MANETs include their ability to adapt to route changes due to mobility and the fact that they have no requirement for base stations or access points for node organization.

In theory, a MANET provides an ideal communication infrastructure to support disaster-relief and battlefield operations, emergency search and rescue missions, and many other mobile and distributed applications. However, these applications cannot be supported effectively in today's networks. This is mainly because the networks do not scale due to the excessive signaling incurred with an increasing number of nodes and applications. More specifically, MANET protocols distribute calculations (such as routing information) over many nodes hop-by-hop. To ensure protocol correctness and efficient operation, such as to avoid loops and excessive flooding, complex distributed algorithms are needed.

Centralizing resources has been proposed as an approach to address the growing needs of today's networks. One example is software defined networking (SDN), such as the one based on the OpenFlow protocol. In SDN, the "control plane" and the "data plane" are separated, and at least two control routers are used to instantiate state on the controlled network elements. With SDN, the topology of the network is virtualized at the controller nodes, which compute routes from sources to destinations according to a network-wide view, and can instantiate the "flow-state" at each switch of the network. Unfortunately, current SDN implementations compute paths based on the flow-states of the network, and thus cannot be applied to MANETs. Furthermore, SDN approaches have focused on wired networks operating in server rooms, where the controller is one link away from every switch, and thus do not address the dynamic placement of content and services.

Another approach is information centric networking (ICN) which is based on a publish-subscribe scheme where content objects are given names, all routing nodes act also as caching sites, and requests stating interest in specific content are disseminated in a way similar to route requests where the nearest sites with copies of the request content answer the requests. However, while ICN approaches allow a network to adapt to application needs by dynamically providing content and services from the nearest sites, ICN schemes are limited when applied to large-scale dynamic networks. Because ICN routing is performed on the basis of object names, excessive signaling overhead is incurred. Also, due to the complexity of the nodes (e.g., all routing nodes must also be caching nodes and relaying nodes must evaluate content requests to determine if requested content is stored locally), additional signaling overhead is incurred.

SUMMARY

One embodiment provides a system that facilitates a large-scale mobile ad hoc network to adapt to specific needs of wireless nodes in a mobile wireless network. During operation, a controller node collects state information associated with one or more wireless nodes. The controller node allocates one or more network elements based on the collected state information and a predetermined utility-based technique. Responsive to the allocation of the one or more network elements, the controller node reconfigures a logical topology of the mobile wireless network by using software-defined mobile ad hoc network nodes, thereby facilitating a large-scale mobile ad hoc network to adapt to specific application needs of wireless nodes.

In some embodiments, allocating the one or more network elements is based on an application operating at the one or more wireless nodes.

In some embodiments, the controller node allocates the one or more network elements by applying the predetermined utility-based technique to a specific need of the application operating at one of the one or more wireless nodes, where the predetermined utility-based technique maximizes a performance of the application.

In some embodiments, the state information associated with the one or more wireless nodes indicates one or more of: a resource of the network; a storage facility of the network; a service running on the network; a flow of traffic on the network; a current configuration of a topology of the network; a neighbor node of the one or more wireless nodes, wherein the neighbor node is a next-hop node of the one or more wireless nodes; information relating to the state of one or more neighbor nodes; and knowledge of the controller node.

In some embodiments, the one or more network elements comprise one or more of: a node in the network; an entity in the network; a device on the network; and one or more grouped networks in the mobile wireless network.

In some embodiments, the method is performed by one or more services operating at the controller node.

In some embodiments, the system sends, by the one or more wireless nodes to the controller node, the state information. Responsive to the reconfiguration of the logical topology of the network, the controller node fulfills a need of an application operating at the one or more wireless nodes based on the reconfigured logical topology.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for a mobile application specific network (MASNET) that uses a backbone infrastructure to attain application-specific networking for large-scale MANETs, e.g., battalion-level communication. This application-specific networking is achieved by: incurring an overhead in the network that is smaller than the overhead incurred by current routing schemes; allowing applications to access content and services from the most suitable locations, rather than fixed sites; and dynamically provisioning resources to satisfy the requirements of multiple concurrent applications while maximizing resource utilization and fairness.

Network architecture and protocols have been proposed for use in commercial and military networks. However, these architectures do not support application-specific networking. Commercial network architectures rely on strict hierarchies based on an extensive and careful deployment of infrastructure nodes and the availability of a service cloud accessed through an over-provisioned infrastructure. Traditional military architectures rely on mobile ad hoc networks (MANETs) based on peer-to-peer signaling, reach-back to centralized services, and the use of gateway nodes interconnecting networks with strict boundaries. These network architectures incur unsustainable overhead to maintain routing tables as networks grow in size and require overly complex routing nodes that consume excessive power and bandwidth. These network architectures further require complex and inefficient network engineering to interconnect networks through a few gateway nodes that become traffic bottlenecks, and thus cannot adapt to application requirements.

Embodiments of the present invention provide a system that facilitates application-specific networking and is based on the integration of software defined networking, information centric networking, and utility-based networking approaches. This integration allows large-scale dynamic networks to adapt to the needs of applications while also taking into account the current network state. The system employs the backbone infrastructure without artificial limits to network components or a strict hierarchical network organization into clusters or areas. The entire backbone infrastructure serves as a distributed controller and virtualizes the entire protocol stack.

More specifically, the system includes: 1) software defined MANETs (SDMs) based on an intelligent backbone infrastructure, which eliminate most of the signaling incurred for routing and channel access in dynamic wireless networks, reduce the complexity of network devices and software, and simplify the overall management of the network; 2) an information discovery, exchange and storage (IDES) system which allows applications to discover and use services and content from the most convenient locations in the network based on the state of the network and application requirements, without resulting in network overhead and complexity explosion as the network size and dynamics increase; and 3) utility-based cross-layering (UBCL) mechanisms that allow the network to engineer available resources with zero configuration in order to optimize how the network services applications. The system integrates SDM, IDES, and UBCL based on an intelligent backbone infrastructure that minimizes complexity and maximizes the ability of the network to satisfy service demand.

The backbone infrastructure implements SDMs to cause minimum interference to each other and to communicate seamlessly with one another. The backbone functions as a distributed controller for the rest of the network and further controls the SDM nodes. The virtualized network state spans the entire protocol stack, not just the network layer. The backbone controller can monitor the geographical location of nodes, their radio connectivity to other nodes, and active information flows in the network. Thus, the backbone controller can control routes, radio channels used by different MANETs, nodes that should operate as gateways between MANETs, and transmission schedules used to access available channels. This flexibility can be useful, e.g., in the battlefield, where the physical deployment of nodes and the transmission ranges of military radios result in many nodes in radio connectivity of one another while belonging to separate social groups. Signaling between the backbone controller and SDM nodes (e.g., sending requests for routes to destinations and receiving responses from the backbone) is described in U.S. patent application Ser. Nos. 14/161,410 and 14/161,406.

Embodiments of the present invention further include a system to discover, exchange, and store information (IDES). In traditional networks, end-user applications use names to denote the requested services or content, while efficient packet forwarding needs fixed-length addresses of destinations. Thus, either a directory service is needed to map names to addresses, or routing must be performed on identifiers of content and services. However, as described above, existing approaches, such as ICN, to name resolution or content routing incur excessive signaling overhead and are not applicable to large-scale dynamic networks such as MASNETs. The information discovery method of the present invention provides directory and storage services through a subset of nodes on a publish-subscribe basis, where entities submit their requests towards nearby IDES nodes, and IDES nodes determine where content or services are located using a family of consistent hashing functions. Content can be cached on demand in the network, and caching nodes can be IDES nodes or other nodes willing to advertise content meant for local consumption. Providing a unified name-resolution framework designed to enable efficient name resolution across heterogeneous name-resolution systems operating in dynamic or static networks is described in U.S. patent application Ser. No. 15/823,188.

In IDES, all network nodes maintain routes to nearby IDES nodes, all IDES nodes maintain routes to one another, and network nodes select those nodes in a distributive manner that should be IDES nodes so that no manual configuration of nodes is needed. Selecting IDES nodes can be performed by using a new distributed (k, d)-dominating set algorithm, with each network node being covered by at least k IDES nodes at a distance no larger than d. The running of the algorithm can be expedited by network-state information maintained by the backbone controller.

The MASNET of the present invention also uses utility-based networking, such as a utility-based cross layering mechanism (UBCL). In general, utility-based networking allows applications to represent their data in utility models such that each individual data sample or content object can be ranked with its value to a receiving node. A receiving node can use a separate application-specific relevance function to express to the network its interest in the data stream of an application. A receiving or forwarding node aggregates receiver relevance over the entire network and determines how and where to forward individual packets or content objects. More specifically, UBCL uses application-specific utility functions at a content producer to assign a "microutility" to each packet, such that an ensemble of packets realizes an application-specific utility curve. A microutility assigns a dynamically changing priority to each individual content object in transit. At the same time, content requesters designate a relevance to them for the data. The application utility and relevance functions together inform the network about the importance of microutility shaped traffic along different paths, and further allow the network to intelligently drop data or add resources when faced with congestion or delay.

Network Architecture and Exemplary Communication

The protocol stacks used in today's wireless networks are inherently based on peer-to-peer signaling and are designed to operate with limited information. In these existing protocols, the control and data planes do not take into account much of the context within which user data are disseminated, and each packet specifies its own context in its headers. Backbones are exploited only at the link level within the context of hierarchical network architectures used to cope with size. In contrast, the present invention provides a system which uses a backbone infrastructure, e.g., a backbone service provider, to attain application-specific networking for large-scale mobile ad hoc networks (MA-NETs). In some embodiments, the system includes a centralized backbone service which maintains a weighted graph of a wireless network and includes a number of mobile nodes that can send status updates to the backbone service to report state-related information (as described in U.S. patent application Ser. Nos. 14/161,410 and 14/161,406). The system can also use flow-specific routing to enable quality of service (QoS), where the backbone collects neighborhood information reported by a set of wireless nodes and uses the collected information to determine an optimal route to the destination for a given flow (as described in U.S. patent application Ser. Nos. 14/161,410 and 14/161,406).

In some embodiments, the mobile nodes monitor their neighborhood environment to periodically report state-related information to the backbone. The state-related information reported by the mobile nodes to the backbone can include neighborhood metrics (e.g., a link quality to each one-hop neighbor based on received signals), a set of multicast addresses used by the node, a geographic location (e.g., global positioning system (GPS) coordinates) for the mobile node, and a change in the content cached (if any) by the mobile node. In some embodiments, a controller node in the centralized backbone service collects the state-related information from the wireless nodes. The state-related information can further include: traffic flow of the network; resources, storage or services on the network; the current configuration of the network; neighbor nodes and state information associated with the neighbor nodes; and knowledge of the controller node. Furthermore, the system can apply a utility-based cross layer mechanism (UBCL) to determine how to provision various network elements in order to maximize the performance based on the collected state information and the utility-based mechanism.

Figure 1A:
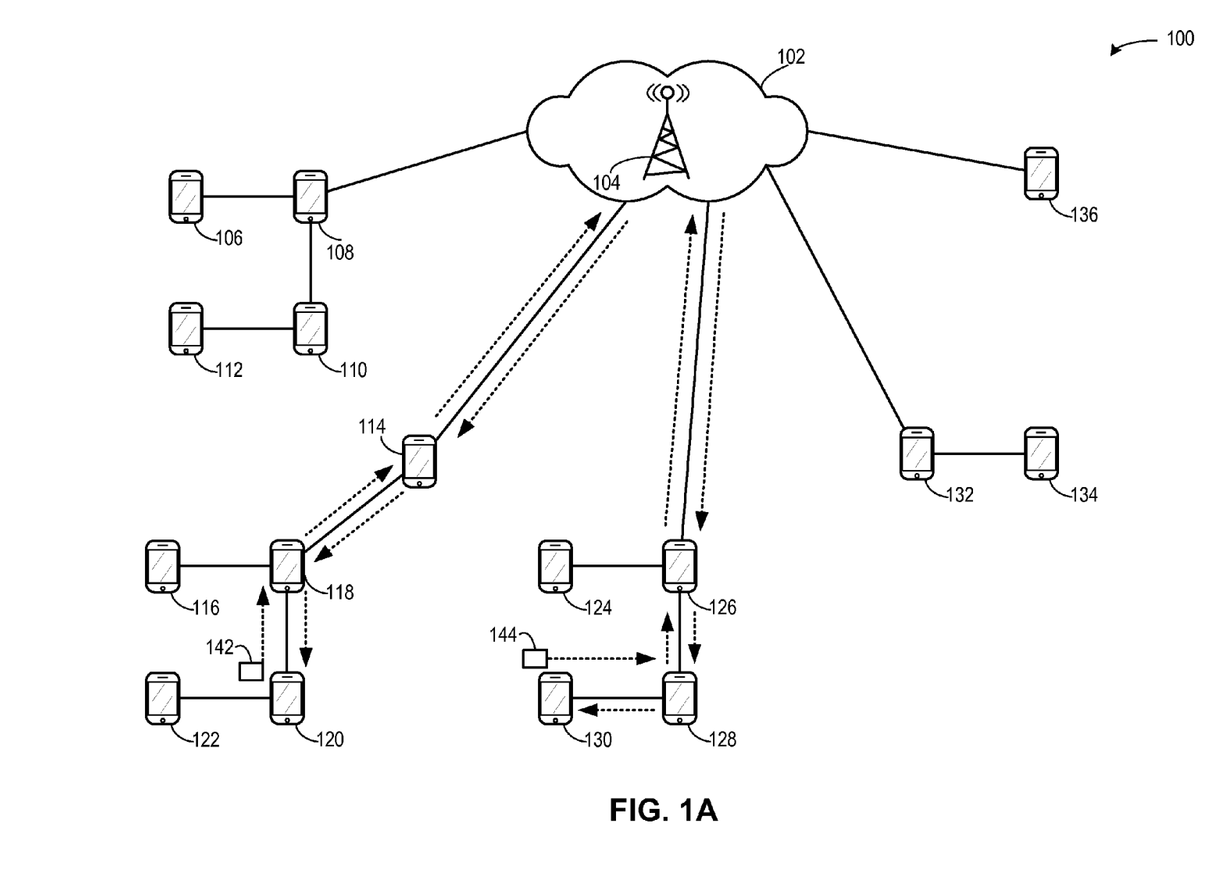
FIG. 1A presents a diagram illustrating an exemplary mobile ad hoc network (MANET), including the routing of a packet from one node to another node.

FIG. 1A presents a diagram illustrating an exemplary mobile ad hock network (MANET) 100, including the routing of a packet from one node to another node. Unlike embodiments of the present invention, network 100 does not adapt to application-specific needs and does not employ a backbone service. Network 100 can include a base station network 102 and a set of mobile network nodes 106-136. More specifically, base station network 102 can include one or more base station nodes, such as a base station node 104, which communicate with each other via a wired or wireless network. At least some of mobile nodes 106-136 can communicate with base station network 102 over a wireless network, either directly or via a multi-hop path. For example, mobile node 108 is coupled to base station network 102 via a one-hop link, whereas mobile node 106 is coupled to base station network 102 via a two-hop link through node 108.

Similar to architectures used in IP subnets and MANET channels, an application operating at a mobile node in network 100 uses the network with the static network topology as depicted. For example, if an application operating at mobile node 120 is interested in a piece of content that is available only from mobile node 130, mobile node 120 sends a request (depicted by a packet 142) that travels through mobile node 118, mobile mode 114, base station node 104, mobile node 126, mobile node 128, and finally reaches mobile node 130. Mobile node 130 sends the requested content (depicted by a packet 144) back to mobile node 120 along the reverse path.

Figure 1B:
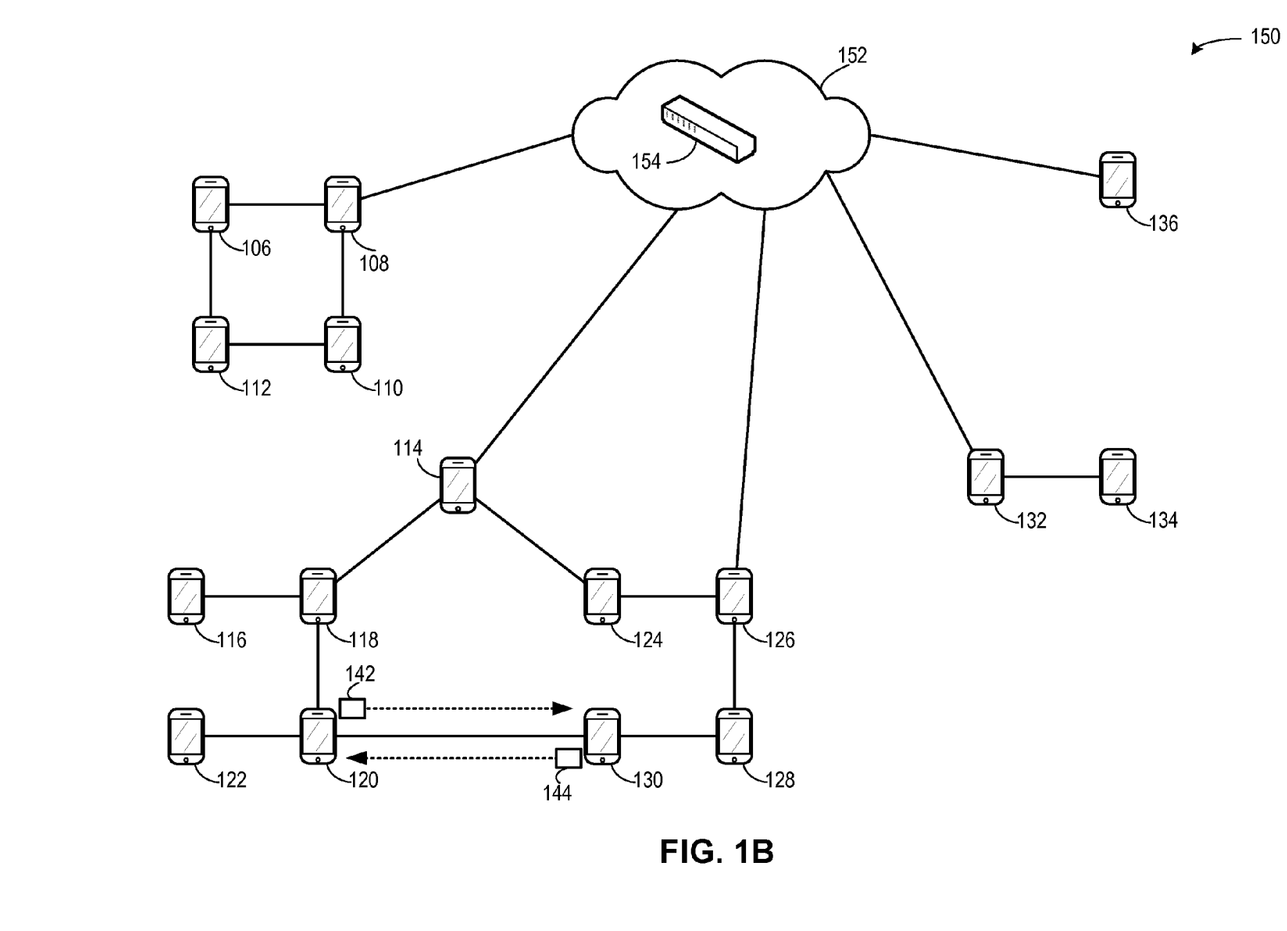
FIG. 1B presents a diagram illustrating an exemplary mobile application specific network (MASNET), including the routing of a packet from one node to another node, in accordance with an embodiment of the present invention.

FIG. 1B presents a diagram illustrating an exemplary mobile application specific network (MASNET) 150, including the routing of a packet from one node to another node, in accordance with an embodiment of the present invention. MASNET 150 can include a backbone cloud 152 (hereinafter referred to as "backbone 152") and a set of mobile network nodes 106-136. More specifically, backbone 152 can include one or more controller nodes, such as a controller node 154, which communicate with each other via a wired or wireless network. At least some of mobile nodes 106-136 can communicate with backbone 152 over a wireless network, either directly or via a multi-hop path.

During operation, controller node 154 collects state information from mobile nodes 106-136. The state information can include information relating to resources, storage, and services available on MASNET 150. The state information can also include information relating to the flow of traffic on the network, the current configuration of the network topology, one or more neighbor nodes, the state of the neighbor nodes, knowledge of the controller node, and application-specific needs of the mobile nodes. Based on the collected information, controller node 154 applies a utility-based mechanism to allocate network elements. In response to allocating the network elements, the system can further shape or reconfigure the topology of network 150 by using software-defined mobile ad hoc network (SDM) nodes.

For example, in MASNET 150, controller node 154 collects state information from and relating to mobile nodes 106-136, including the application-specific need of mobile node 120 to send a packet 142 requesting specific content to mobile node 130, and the application-specific need of mobile node 130 to transmit a packet 144 containing the requested content to mobile node 120. Based on the collected state information, controller node 154 performs two actions: 1) applies a utility-based mechanism to allocate the network elements; and ii) reconfigures MASNET 150 to achieve the applied utility mechanism. For example, controller node 154 can reconfigure the network such that there is an SDM link directly between mobile node 120 and mobile node 130, allowing for more efficient flow of traffic between mobile node 120 and mobile node 130. FIG. 1B also depicts additional SDM links added as part of the reconfiguration by controller node 154: direct links between mobile node 114 and mobile node 124, and between mobile node 106 and mobile node 112. This reconfiguration can be in response to applying the utility-based mechanism based on collected state information in MASNET 150.

Thus, in conventional MANETs, the routing operations (unicast or multicast) are performed in a peer-to-peer manner, which can be inefficient and limits the network scalability, as shown in FIG. 1A. In contrast, in the example shown in FIG. 1B, backbone 152 provides a centralized backbone service to a set of mobile nodes. The backbone service relieves most routing overhead from the MASNET (which includes the mobile nodes) by using node information reported to or collected by backbone 152. Generation of optimal unicast routes and computing shared multicast trees per multicast group are described in U.S. patent application Ser. Nos. 14/161,410 and 14/161,406.

Figure 2:
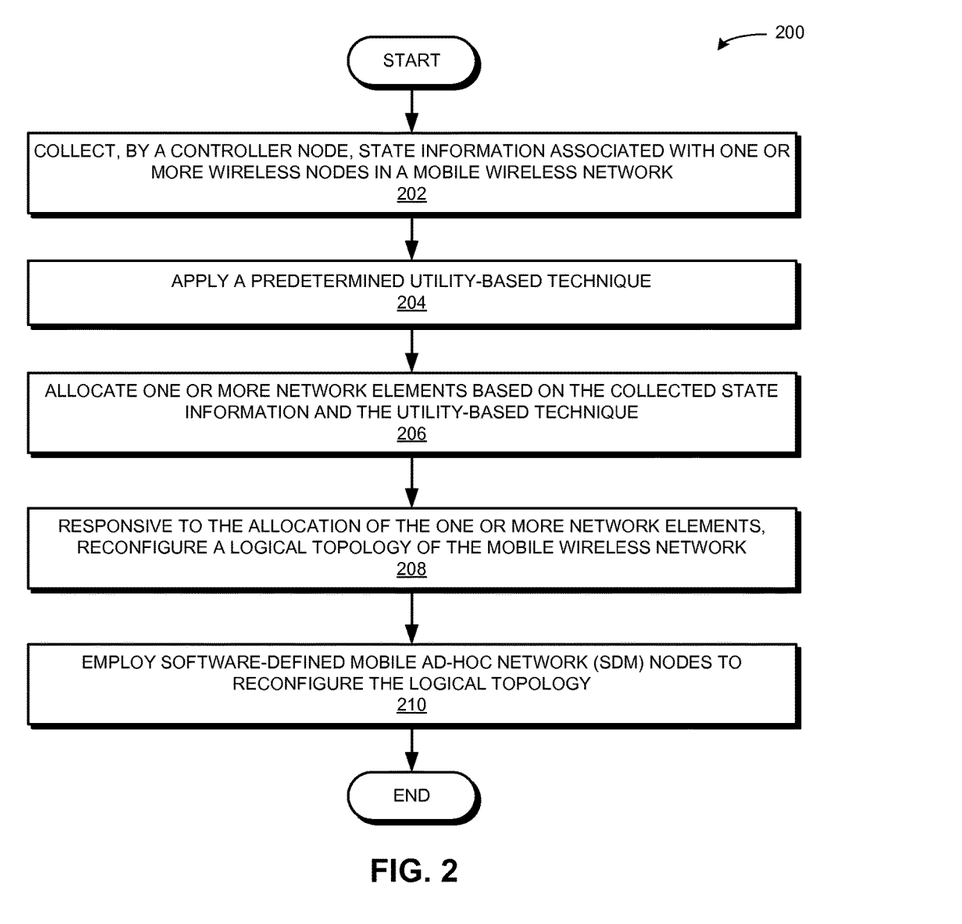
FIG. 2 presents a flowchart illustrating an exemplary routing process performed by a controller node in the backbone, in accordance with an embodiment of the present invention.

FIG. 2 presents a flowchart 200 illustrating an exemplary routing process performed by a controller node in the backbone, in accordance with an embodiment of the present invention. The system collects, by a controller node, state information associated with one or more wireless nodes in a mobile wireless network (operation 202). The controller node applies a predetermined utility-based technique to the collected information (operation 204) and allocates one or more network elements based on the collected state information and the utility-based technique (operation 206). Responsive to the allocation of the one or more network elements, the system reconfigures a logical topology of the mobile wireless network (operation 208). The system employs SDM nodes to perform the reconfiguring of the network based on the collected information and the network element allocation (operation 210).

Exemplary Routing of Packets with Dynamic QoS

Figure 3A:
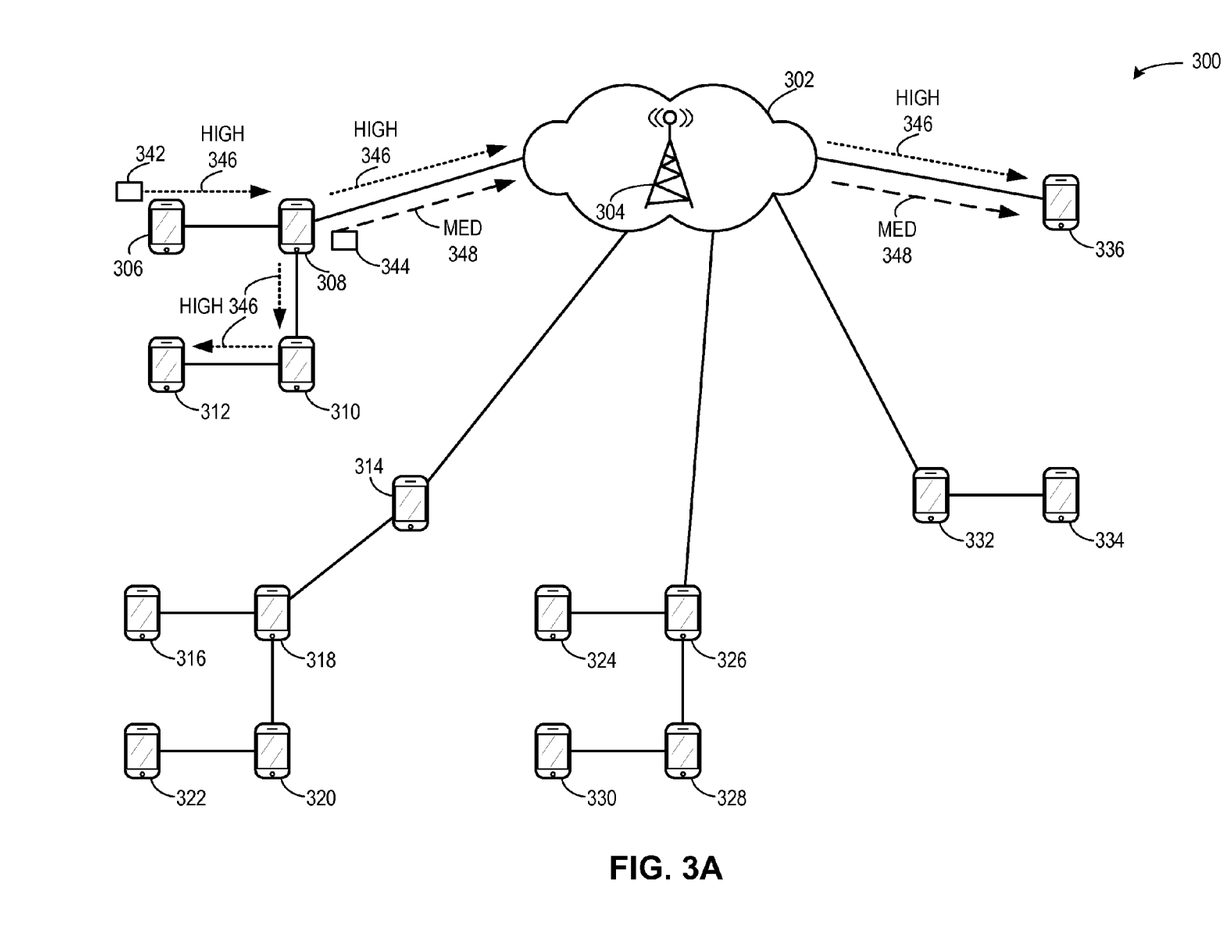
FIG. 3A presents a diagram illustrating an exemplary mobile ad hoc network (MANET), including the routing of a packet with a Quality of Service marker.

FIG. 3A presents a diagram illustrating an exemplary mobile ad hoc network (MANET) 300, including the routing of a packet with a Quality of Service (QoS) marker. Network 300 can include a base station network 302 and a set of mobile network nodes 306-336. More specifically, base station network 302 can include one or more base station nodes, such as a base station node 304, which communicate with each other via a wired or wireless network. At least some of mobile nodes 306-336 can communicate with base station network 302 over a wireless network, either directly or via a multi-hop path. Similar to network 300 depicted in FIG. 1A, network 300 has an architecture like that used in IP subnets and MANET channels where the topology is relatively static. For example, using IP Quality of Service (QoS) markers, an application operating at a mobile node can specify only a simple, unchanging priority for data packets. In other words, data packets transmitted across network 300 have static priorities. An application in network 300 requiring dynamic priorities for a data packet based on, e.g., the destination of the packet, needs to create multiple data streams with differing priorities. Alternatively, the system can implement application-specific rules and place these rules in the configuration files of each affected network element. Without these workarounds, traffic may be classified incorrectly or inaccurately in network 300.

During operation, if mobile node 306 wishes to send a packet 342 of high priority (indicated by a high 346 priority) to mobile node 312, packet 342 travels from mobile node 306 to mobile node 308 to mobile node 310, and finally reaches mobile node 312. Furthermore, because there is only one multicast stream, when packet 342 reaches mobile node 308, the system also sends packet 342 through backbone 302 to mobile node 336 (indicated by the high 346 priority). Packet 342 retains the same priority in traveling to and reaching both of mobile nodes 312 and 336. At the same time, if mobile node 308 wishes to send a packet 344 of medium priority (indicated by a medium 348 priority) to mobile node 336, packet 344 travels from mobile node 308 to backbone 302 and on to mobile node 336.

However, in the case where packet 342 is meant for high priority only to mobile node 312 and is meant only as low priority for mobile node 336, the stream of packet 342 with high 346 priority from mobile node 308 to mobile node 336 contends with the stream of packet 344 with medium 348 priority on the same path (from mobile node 308 to mobile node 336). In other words, the high priority of packet 342 takes precedence over the medium priority of packet 344. Since there is only one multicast stream, the stream of packet 344 is mis-categorized on the link over backbone cloud 302. Furthermore, part of the medium priority stream of packet 344 may be improperly dropped.

Figure 3B:
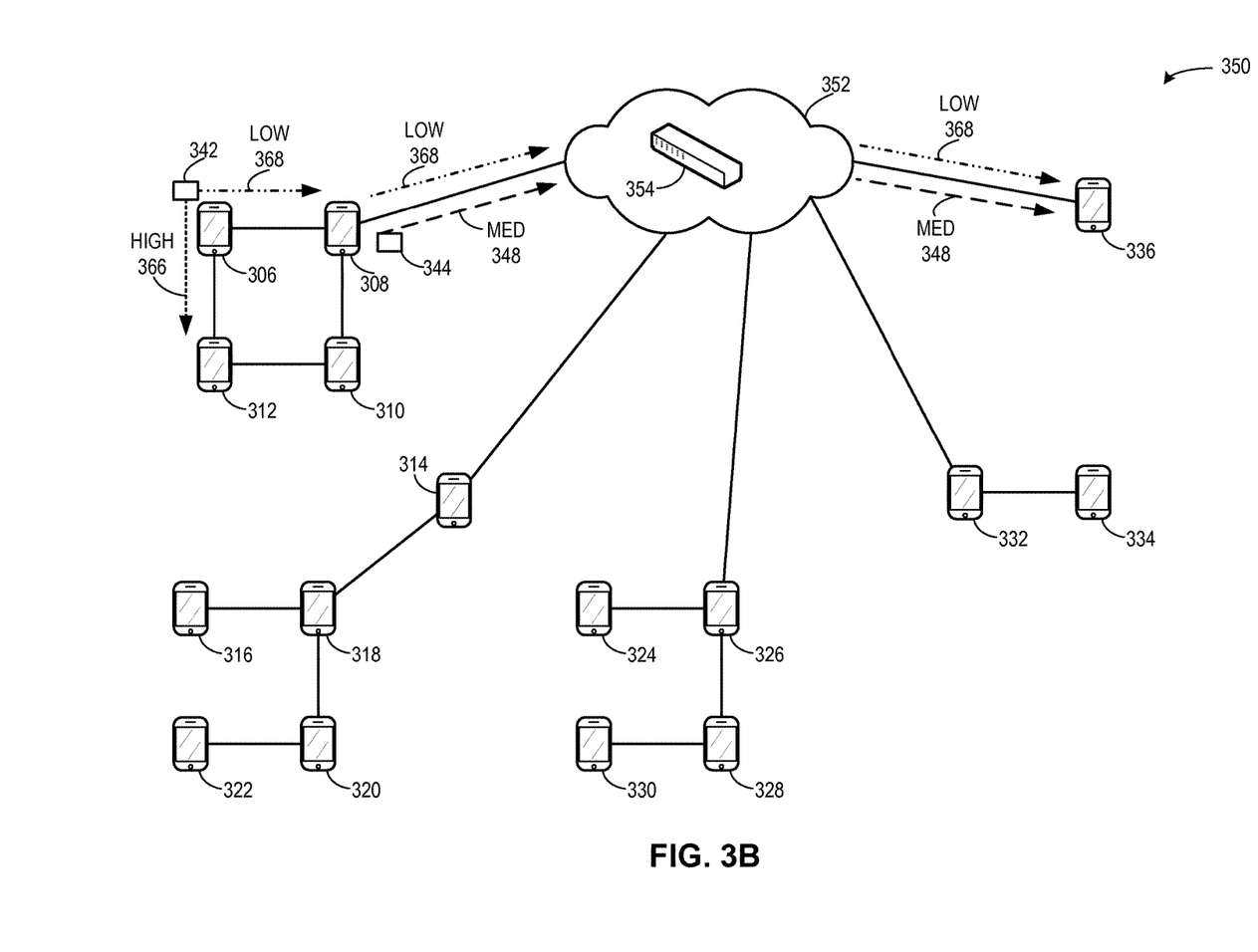
FIG. 3B presents a diagram illustrating an exemplary mobile application specific network (MASNET), including the routing of a packet with a Quality of Service marker, in accordance with an embodiment of the present invention.

FIG. 3B presents a diagram illustrating an exemplary mobile application specific network (MASNET) 350, including the routing of a packet with a quality of service marker, in accordance with an embodiment of the present invention. MASNET 350 can include a backbone cloud 352 (hereinafter referred to as "backbone 352") and a set of mobile network nodes 306-336. More specifically, backbone 352 can include one or more controller nodes, such as a controller node 354, which communicate with each other via a wired or wireless network. At least some of the mobile nodes 306-336 can communicate with backbone cloud 352 over a wireless network, either directly or via a multi-hop path. During operation, controller node 354 collects state information relating to mobile nodes 306-336 in MASNET 350, including the application-specific need of mobile node 306 to send a packet 342 of high priority to mobile node 312. Based on the collected state information, controller node 354 performs two actions: 1) applies a utility-based mechanism to allocate the network elements; and ii) reconfigures network 350 to achieve the applied utility mechanism. Controller node 354 can apply a utility-based mechanism that assigns a packet with a dynamic microutility such that the priority of the packet changes as the packet travels through network 350 based on the receiving mobile node.

In FIG. 3B, when mobile node 306 sends packet 342 of high priority to mobile node 312, an application-specific utility function labels packet 342 to inform network 350 that packet 342 is high priority for mobile node 312 (indicated by a high 366 priority), but only low priority for mobile node 336 (indicated by a low 368 priority). In this manner, because the priority of packet 342 is dynamically and accurately re-labeled in the link from mobile node 308 to mobile node 336, the low 368 priority stream of packet 342 does not contend with the medium 348 priority stream of packet 344 between mobile node 308 and mobile node 336. Thus, medium priority packet 344 is correctly classified and reaches mobile node 336 without being improperly dropped. Furthermore, in response to applying a utility-based mechanism, controller node 354 can reconfigure the network such that there is an SDM link directly between mobile node 306 and mobile node 312, allowing for more efficient flow of traffic from mobile node 306 to mobile node 312.

Figure 4:
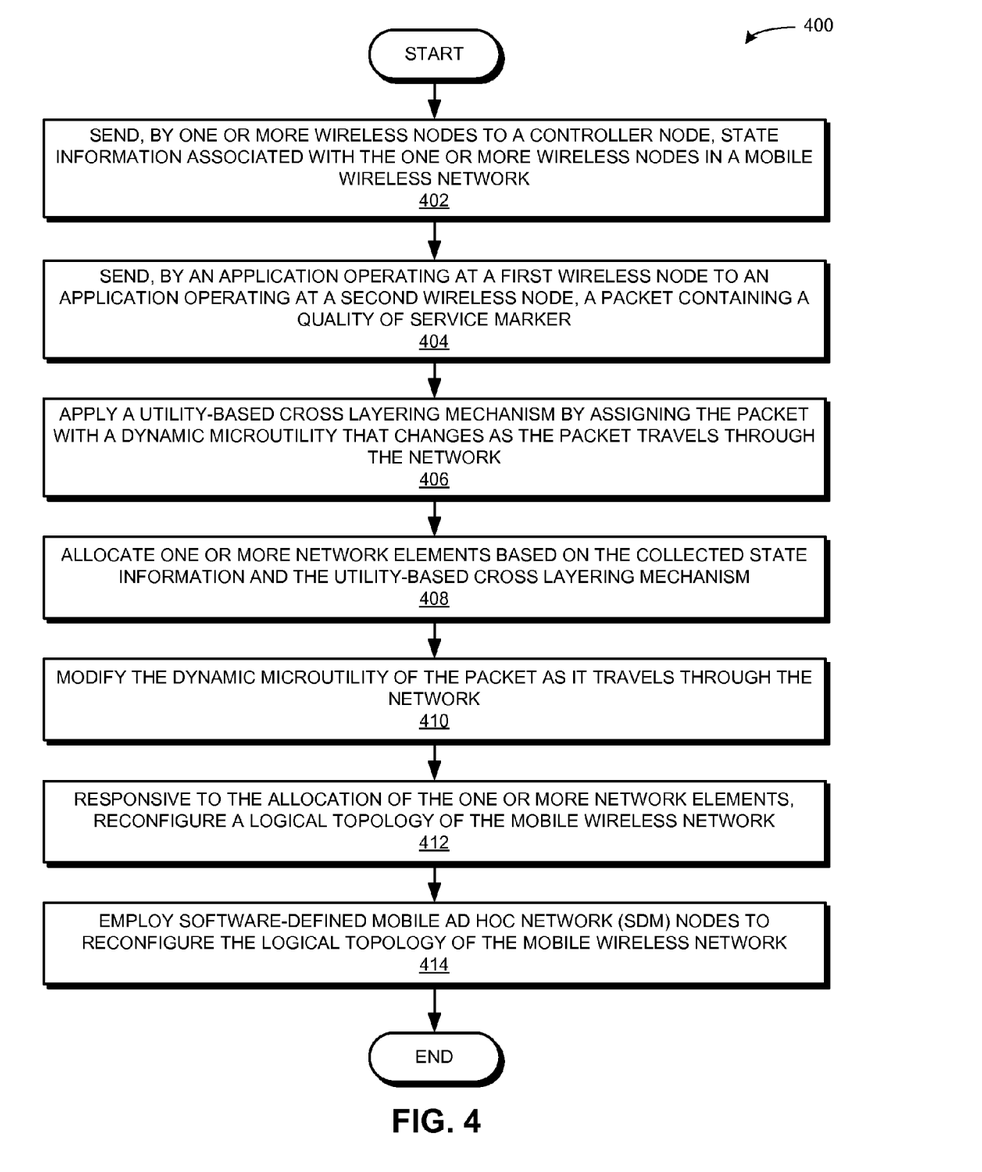
FIG. 4 presents a flowchart illustrating an exemplary routing process performed by a controller node in the backbone, including the routing of packet containing a dynamic Quality of Service marker, in accordance with an embodiment of the present invention.

FIG. 4 presents a flowchart 400 illustrating an exemplary routing process performed by a controller node in the backbone, including the routing of packet containing a dynamic Quality of Service (QoS) marker, in accordance with an embodiment of the present invention. During operation, the system sends, by one or more wireless nodes to a controller node, state information associated with the one or more wireless nodes in a mobile wireless network (operation 402). An application operating at a first wireless node sends to an application operating at a second wireless node a packet containing a QoS marker indicating a level of priority for the packet (operation 404). The system applies a utility-based cross layering mechanism by assigning the packet with a dynamic microutility which changes as the packet travels through the network (operation 406). The system, by the controller node, allocates one or more network elements based on the collected state information and the utility-based technique (operation 408). The system further modifies the dynamic microutility of the packet as it travels through the network (operation 410). Responsive to the allocation of the network elements, the controller node reconfigures a logical topology of the network (operation 412) and employs software-defined mobile ad hoc network (SDM) nodes to reconfigure the logical topology of the mobile wireless network (operation 414).

Exemplary Computer and Communication System

Figure 5:
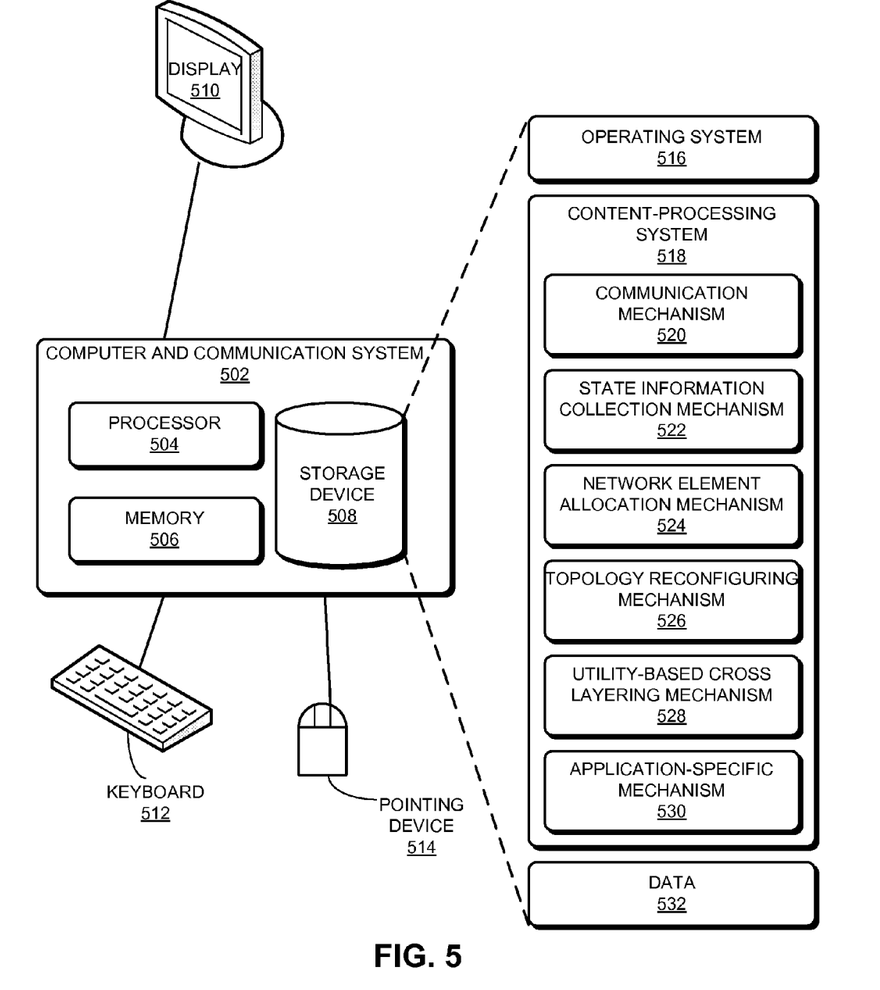
FIG. 5 illustrates an exemplary computer and communication system that facilitates a large-scale MANET to adapt to application-specific needs of wireless nodes in a mobile wireless network, in accordance with an embodiment of the present invention.

FIG. 5 illustrates an exemplary computer and communication system 502 that facilitates a large-scale MANET to adapt to specific application needs of wireless node in a mobile wireless network, in accordance with an embodiment of the present invention. Computer and communication system 502 includes a processor 504, a memory 506, and a storage device 508. Memory 506 can include a volatile memory (e.g., RAM) that serves as a managed memory, and can be used to store one or more memory pools. Furthermore, computer and communication system 502 can be coupled to a display device 510, a keyboard 512, and a pointing device 514. Storage device 508 can store an operating system 516, a content-processing system 518, and data 532.

Content-processing system 518 can include instructions, which when executed by computer and communication system 502, can cause computer and communication system 502 to perform methods and/or processes described in this disclosure. Specifically, content-processing system 518 may include instructions for collecting, by a controller node, state information associated with one or more wireless nodes (state information collection mechanism 522). Content-processing system 518 can also include instructions for allocating one or more network elements based on the collected state information and a predetermined utility-based technique (network element allocation mechanism 524). Content-processing system 518 can include instructions for, responsive to the allocation of the one or more network elements, reconfiguring a logical topology of the mobile wireless network by using software-defined mobile ad hoc (SDM) nodes (topology reconfiguration mechanism 526). Content-processing system 518 can also include instructions for applying the predetermined utility-based technique to a specific need of the application operating at the one or more wireless nodes, where the utility technique maximizes a performance of the application (utility-based cross layering mechanism 528).

Content-processing system 518 can further include instructions for sending, by the one or more wireless nodes to the controller node, the state information (communication mechanism 520 and state information collection mechanism 522). Content-processing system 518 can include instructions for, responsive to the reconfiguration of the logical topology of the network, fulfilling a need of an application operating at the one or more wireless nodes based on the reconfigured logical topology (application-specific mechanism 530).

Data 532 can include any data that is required as input or that is generated as output by the methods and/or processes described in this disclosure. Specifically, data 532 can store at least: a packet; state information associated with one or more wireless nodes, including information relating to a resource of the network, a storage facility of the network, a service running on the network, a flow of traffic on the network, and a current configuration of a topology of the network; information relating to a neighbor node of the one or more wireless nodes, including state information relating to the neighbor node; information relating to knowledge of a controller node; a utility-based networking method; a utility-based cross layering mechanism; an application-specific utility curve; a relevance function based on the utility-based cross layering mechanism; a microutility associated with the packet; a microutility that assigns a dynamic priority to each packet or content object; an application-specific need of an application operating at the one or more wireless nodes; a reconfiguration of the network topology; an indicator of the application utility to the content publisher; and an indicator of the relevance of a packet to a content subscriber.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for routing in a wireless large-scale mobile ad hoc network, comprising:
   collecting, by a centralized controller node, state information associated with one or more software-defined mobile ad hoc network nodes;
   monitoring, by the centralized controller node, a geographical location of each of the one or more software-defined mobile ad hoc network nodes, wherein the centralized controller node is configured to control routes between the one or more software-defined mobile ad hoc network nodes based on the geographical location of each of the one or more software-defined mobile ad hoc network nodes;
   applying, by the centralized controller node, a predetermined utility-based technique to the collected state information, wherein the predetermined utility-based technique assigns a packet with a dynamic microutility which changes as the packet travels through the large-scale mobile ad hoc wireless network, wherein the dynamic microutility of the packet is based on a destination node of the packet;
   allocating, by the centralized controller node, one or more network elements based on the collected state information and the predetermined utility-based technique, wherein the one or more network elements comprise one or more of: a software-defined mobile ad hoc network node in the large-scale mobile ad hoc network, an entity in the large-scale mobile ad hoc network, a device on the large-scale mobile ad hoc network, and one or more grouped networks in the wireless large-scale mobile ad hoc network;
   responsive to the allocation of the one or more network elements, reconfiguring, by the centralized controller node, a logical topology of the wireless large-scale mobile ad hoc network by using the one or more software-defined mobile ad hoc network nodes; and
   adapting the large-scale mobile ad hoc network to specific application needs of the one or more software-defined mobile ad hoc network nodes.

2. The method of claim 1, wherein allocating the one or more network elements is based on an application operating at the one or more software-defined mobile ad hoc network nodes.

3. The method of claim 2, wherein applying the predetermined utility-based technique further comprises:
   applying the predetermined utility-based technique to a specific need of the application operating at one of the one or more software-defined mobile ad hoc network nodes,
   wherein the predetermined utility-based technique maximizes a performance of the application.

4. The method of claim 1, wherein the state information associated with the one or more software-defined mobile ad hoc network nodes indicates one or more of:
   a resource of the wireless large-scale mobile ad hoc network;
   a storage facility of the wireless large-scale mobile ad hoc network;
   a service running on the wireless large-scale mobile ad hoc network;
   a flow of traffic on the wireless large-scale mobile ad hoc network;
   a current configuration of a topology of the wireless large-scale mobile ad hoc network;
   a neighbor node of the one or more software-defined mobile ad hoc network nodes, wherein the neighbor node is a next-hop node of the one or more software-defined mobile ad hoc network nodes;
   information relating to the state of one or more neighbor nodes; and
   knowledge of the centralized controller node.

5. The method of claim 1, wherein the method is performed by one or more services operating at the centralized controller node.

6. The method of claim 1, wherein collecting the state information further comprises:
   sending, by the one or more software-defined mobile ad hoc network nodes to the centralized controller node, the state information; and
   responsive to the reconfiguration of the logical topology of the wireless large-scale mobile ad hoc network, fulfilling a need of an application operating at the one or more software-defined mobile ad hoc network nodes based on the reconfigured logical topology.

7. The method of claim 1, wherein the dynamic microutility is a Quality of Service marker.

8. A computer system for facilitating routing in a wireless large-scale mobile ad hoc network, the system comprising:
   a processor; and
   a storage device storing instructions that when executed by the processor cause the processor to perform a method, the method comprising:
   collecting, by a centralized controller node, state information associated with one or more software-defined mobile ad hoc network nodes;

monitoring, by the centralized controller node, a geographical location of each of the one or more software-defined mobile ad hoc network nodes, thereby enabling the centralized controller node to control routes between the one or more software-defined mobile ad hoc network nodes;

applying, by the centralized controller node, a predetermined utility-based technique to the collected state information, wherein the predetermined utility-based technique assigns a packet with a dynamic microutility which changes as the packet travels through the wireless large-scale mobile ad hoc network, wherein the dynamic microutility of the packet is based on a destination node of the packet;

allocating, by the centralized controller node, one or more network elements based on the collected state information and the predetermined utility-based technique, wherein the one or more network elements comprise one or more of: a software-defined mobile ad hoc network node in the large-scale mobile ad hoc network, an entity in the large-scale mobile ad hoc network, a device on the large-scale mobile ad hoc network, and one or more grouped networks in the wireless large-scale mobile ad hoc network;

responsive to the allocation of the one or more network elements, reconfiguring, by the centralized controller node, a logical topology of the wireless large-scale mobile ad hoc network by using the one or more software-defined mobile ad hoc network nodes; and adapting the large-scale mobile ad hoc network to specific application needs of the one or more software-defined mobile ad hoc network nodes.

9. The computer system of claim 8, wherein allocating the one or more network elements is based on an application operating at the one or more software-defined mobile ad hoc network nodes.

10. The computer system of claim 9, wherein applying the predetermined utility-based technique further comprises:
applying the predetermined utility-based technique to a specific need of the application operating at one of the one or more software-defined mobile ad hoc network nodes,
wherein the predetermined utility-based technique maximizes a performance of the application.

11. The computer system of claim 8, wherein the state information associated with the one or more software-defined mobile ad hoc network nodes indicates one or more of:
a resource of the wireless large-scale mobile ad hoc network;
a storage facility of the wireless large-scale mobile ad hoc network;
a service running on the wireless large-scale mobile ad hoc network;
a flow of traffic on the wireless large-scale mobile ad hoc network;
a current configuration of a topology of the wireless large-scale mobile ad hoc network;
a neighbor node of the one or more software-defined mobile ad hoc network nodes, wherein the neighbor node is a next-hop node of the one or more software-defined mobile ad hoc network nodes;
information relating to the state of one or more neighbor nodes; and
knowledge of the centralized controller node.

12. The computer system of claim 8, wherein the method is performed by one or more services operating at the centralized controller node.

13. The computer system of claim 8, wherein collecting the state information further comprises:
sending, by the one or more software-defined mobile ad hoc network nodes to the centralized controller node, the state information; and
responsive to the reconfiguration of the logical topology of the wireless large-scale mobile ad hoc network, fulfilling a need of an application operating at the one or more software-defined mobile ad hoc network nodes based on the reconfigured logical topology.

14. The computer system of claim 8, wherein the dynamic microutility is a Quality of Service marker.

15. A non-transitory computer-readable storage medium storing instructions that when executed by a computing device cause the computing device to perform a method for routing in a wireless large-scale mobile ad hoc network, the method comprising:
collecting, by a centralized controller node, state information associated with one or more software-defined mobile ad hoc nodes;
monitoring, by the centralized controller node, a geographical location of each of the one or more software-defined mobile ad hoc nodes, thereby enabling the centralized controller node to control routes between the one or more software-defined mobile ad hoc nodes;
applying, by the centralized controller node, a predetermined utility-based technique to the collected state information, wherein the predetermined utility-based technique assigns a packet with a dynamic microutility which changes as the packet travels through the wireless large-scale mobile ad hoc network, wherein the dynamic microutility of the packet is based on a destination node of the packet;
allocating, by the centralized controller node, one or more network elements based on the collected state information and the predetermined utility-based technique, wherein the one or more network elements comprise one or more of: a software-defined mobile ad hoc network node in the large-scale mobile ad hoc network, an entity in the large-scale mobile ad hoc network, a device on the large-scale mobile ad hoc network, and one or more grouped networks in the wireless large-scale mobile ad hoc network;
responsive to the allocation of the one or more network elements, reconfiguring, by the centralized controller node, a logical topology of the wireless large-scale mobile ad hoc network by using the one or more software-defined mobile ad hoc network nodes; and
adapting the large-scale mobile ad hoc network to specific application needs of the one of more software-defined mobile ad hoc network nodes.

16. The storage medium of claim 15, wherein allocating the one or more network elements is based on an application operating at the one or more software-defined mobile ad hoc network nodes.

17. The storage medium of claim 16, wherein applying the predetermined utility-based technique further comprises:
applying the predetermined utility-based technique to a specific need of the application operating at one of the one or more software-defined mobile ad hoc network nodes,
wherein the predetermined utility-based technique maximizes a performance of the application.

18. The storage medium of claim 15, wherein the state information associated with the one or more software-defined mobile ad hoc network nodes indicates one or more of:
- a resource of the wireless large-scale mobile ad hoc network;
- a storage facility of the wireless large-scale mobile ad hoc network;
- a service running on the wireless large-scale mobile ad hoc network;
- a flow of traffic on the wireless large-scale mobile ad hoc network;
- a current configuration of a topology of the wireless large-scale mobile ad hoc network;
- a neighbor node of the one or more software-defined mobile ad hoc network nodes, wherein the neighbor node is a next-hop node of the one or more software-defined mobile ad hoc network nodes;
- information relating to the state of one or more neighbor nodes; and
- knowledge of the centralized controller node.

19. The storage medium of claim 15, wherein the method is performed by one or more services operating at the centralized controller node.

20. The storage medium of claim 15, wherein collecting the state information further comprises:
- sending, by the one or more software-defined mobile ad hoc network nodes to the centralized controller node, the state information; and
- responsive to the reconfiguration of the logical topology of the wireless large-scale mobile ad hoc network, fulfilling a need of an application operating at the one or more software-defined mobile ad hoc network nodes based on the reconfigured logical topology.

21. The storage medium of claim 15, wherein the dynamic microutility is a Quality of Service marker.

* * * * *